United States Patent [19]
Glomb

[11] Patent Number: 4,748,686
[45] Date of Patent: May 31, 1988

[54] COHERENCE MULTIPLEXED OPTICAL POSITION TRANSDUCER

[75] Inventor: Walter L. Glomb, Ellington, Conn.

[73] Assignee: United Technologies Corporation, Hartford, Conn.

[21] Appl. No.: 919,274

[22] Filed: Oct. 15, 1986

[51] Int. Cl.$^4$ ............................................. H04B 9/00
[52] U.S. Cl. ...................................... 455/605; 73/655; 324/96; 455/612
[58] Field of Search ................. 455/605, 610, 612; 324/96; 350/96.16; 250/227; 370/3, 4; 73/655, 656, 657; 356/349

[56] References Cited

U.S. PATENT DOCUMENTS

| | | | |
|---|---|---|---|
| 4,545,253 | 10/1985 | Avicola | 73/655 |
| 4,613,752 | 9/1986 | Davis | 250/227 |

OTHER PUBLICATIONS

Brooks et al.-"Coherence Multipleying"-Jour. of Lightwave Tech., vol. LT3, No. 5, Oct. 1985, pp. 1062-1071.

Primary Examiner—Joseph A. Orsino, Jr.
Attorney, Agent, or Firm—Eric W. Petraske

[57] ABSTRACT

An optical fiber transducer system employs a single optical fiber that carries an optical carrier signal to a remote transducer location and also carries a multiplexed multichannel signal, each channel having a characteristic delay and a binary amplitude value, to a receiving unit, where each channel of a set of reference signals having a corresponding characteristic delay interferes with the multiplexed signal to separate a channel signal that is envelope detected.

3 Claims, 2 Drawing Sheets ically could be employed. We note that the relative delays on the fibers are set, while the amplitudes change according to the position of the transducer.

COHERENCE MULTIPLEXED OPTICAL POSITION TRANSDUCER

TECHNICAL FIELD

The field of the invention is that of position transducers using optical means to sense a displacement and optical means to carry signals representative of the displacement.

BACKGROUND ART

Optically coded position transducers are well known in the art, such as that shown in U.S. Pat. No. 4,546,466. Such transducers have been used in the prior art together with systems that employ either time—or wavelength—multiplexing signal systems to carry all of the signals representing the transducer position information. An optical system using coherence multiplexing is disclosed in a paper entitled *Coherence Multiplexing of Fiber-Optic Interferometic Sensors,* by J. L. Brooks et al, Journal. of Lightwave Technology, Vol. LT-3, No. 5, October, 1985, page 1062, which shows a serial arrangement of interferometers that employs a portion of an interferometer for sensing and requires at least two fibers. In this system, the amplitude of the electrical signal put out by the photodetectors depends not only on the parameter being measured, but also on many other factors. Effectively, the photodetector "sees" the whole system.

DISCLOSURE OF INVENTION

The invention relates to an optical position transducer system in which a single optical fiber is used to carry an optical carrier signal to a transducer section of the system and also to return a set of several sensor signals that represent the position of the transducer. A receiver section employs coherence multiplexing detection to detect the position signals in a set of optical detectors and pass them on for further processing.

A feature of the invention is the use of a set of parallel interferometers to respond to a complex signal containing a number of cw signals at the same optical frequency entering the receiver.

Another feature of the invention is that the amplitude of the detected signal depends on the modulation device and is insensitive to shifts in the amount of phase modulation employed and to amplitude changes in other channels.

Other features and advantages will be apparent from the specification and claims and from the accompanying drawings which illustrate an embodiment of the invention.

BEST MODE OF CARRYING OUT THE INVENTION

Figure 1:
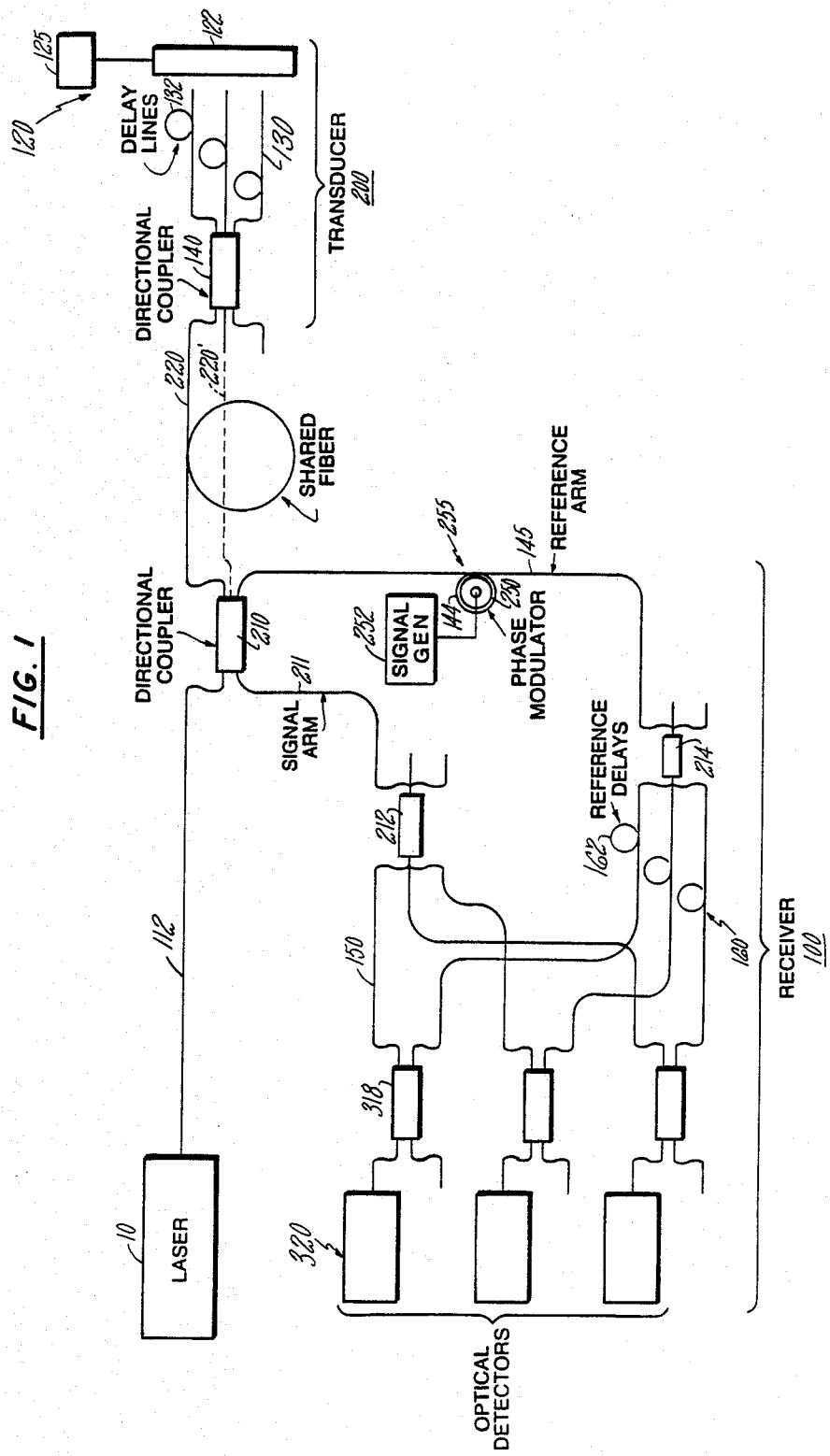
FIG. 1 illustrates schematically an embodiment of the invention.

FIG. 1 shows an embodiment of the invention in which a transducer section on the right side of the figure, denoted by the numeral 200, is connected to a detection or receiver section 100 on the left side by only a single optical fiber 220. The use of a single fiber confers evident advantages in saving space and weight. On the left side of the drawing, an initial optical signal, referred to as an optical carrier signal, is generated in laser 10, illustratively an Amperex CQL14A multimode cw AlGaAs semiconductor diode laser.

Referring now to the right side of the drawing, a transducer referred to generally by the numeral 120 comprises some physical motion device indicated schematically by a box labeled 125 which converts a pressure or other variable to a linear displacement of an optical encoder plate 122. Such an encoder plate is well known in the art, an example being given in the above—mentioned U.S. Pat. No. 4,546,466. Rotary encoders and both reflective and transmissive encoders may also be used. Typically, a set of reflective strips carrying a Gray code or other conventional code is interrogated by a set of N optical fibers 130, one for each strip. The fibers are positioned close to the plate which reflects a large fraction of light back into the fiber when the reflective surface is present and a much smaller fraction when the reflective surface has been moved away.

The use of mechanical motion is not essential to the invention. A modulation device at the end of the optical fiber could be an integrated optics switch or any other device that will have a substantial effect on the amplitude of the optical carrier signal in that sensor fiber.

Each of fibers 130 has a separate delay line 132, each of the delay lines having a different length. The term delay line difference will be used to refer to the smallest difference in delay (whether expressed as a length or as a time) between the delay in any of fibers 130. The set of optical fibers 130 emerges from an optical splitter or coupler 140 that divides an incoming optical carrier signal on a single fiber 220 into the N set of signals on N fibers 130. An example of a suitable coupler 140 is the Amphenol Interfuse TM single mode fiber-optic coupler. The coupler may be 1×N or N×N.

The laser signal will have a coherence length in the fiber that will depend on the laser coherence time and on the properties of fiber. The coherence length is typically on the order of 4 cm for conventional multimode semiconductor lasers that are matched to conventional singlemode optical fibers. As will be described below, the delay line difference must be greater than the coherence length. The relative diameter and other parameters of the fibers in the network can be selected for convenience in coupling efficiency and are not critical.

The initial optical carrier signal travels on source optical fiber 112 through directional coupler 210 and then along fiber 220 to the transducer section of the system where it is amplitude modulated to form a set of N sensor signals representing the transducer position. The sensor signals then travel together through coupler 140 and back along fiber 220 to the detection section where they are separately demodulated as described below. A dotted line labeled with the numeral 220' represents a redundant transmission fiber traveling along a different path between couplers 210 and 140. The light traveling to the left along fiber 220 consists of a set of N cw sensor signals at the same laser frequency of the optical carrier signal. The sensor signals have amplitudes that depend on the reflectivity of the encoder plate and a relative delay that depends on the relative lengths of the several delay loops 132. The signal is effectively divided into channels corresponding to the fibers 130 by the delay loops 132. Conventionally, the amplitudes of the separate sensor signals are binary, though more than two degrees of reflectivity could be used. This is effectively amplitude modulation of a set of N sensor signals that are combined and separated by a form of coherence multiplexing.

This complex return signal returns to directional coupler 210 and then travels through a set of fibers 150 to a set of optical detectors that will be described below. Coupler 210 is also used to split the initial optical carrier signal into one part that travels to the right along fiber 220 and another part that enters fiber 145, which is part of the reference arm of a set of parallel interferometers. The optical carrier signal on fiber 145 passes through a phase modulator which consists of a few loops of fiber, indicated by the numeral 144, looped about piezoelectric cylinder 250, illustratively lead zirconate titanate, referred to in the trade as PZT, that is driven by a reference signal generator 252, which delivers a 1 volt signal at 70 kHz. The piezo modulator stretches the fiber in loops 144, thereby imposing a phase carrier signal on all optical radiation passing through fiber 145 at an arbitrary phase modulator frequency of 70 kHz. Alternatively, an integrated optics phase modulation device could be inserted in the signal path. The optical carrier signal in fiber 145 continues through coupler 214, which divides it into a set of fibers 160 that have a set of delay loops 162, each of which corresponds to one of the set of delay loops 132. The correspondence is such that the total length along the two paths to and from the nth fiber in the transducer section and through the reference arm differs by less than the coherence length of the optical carrier signal. The output of each of fibers 160 is directed on to one of a set of optical detectors 320, each of which detectors also responds to one of a set of sensor fibers denoted generally by the numeral 150. The nth reference fiber 160 will carry a reference signal modulated at the phase carrier frequency and having a phase delay set by the magnitude of the particular delay loop of that nth line. The nth corresponding fiber from set 150 will contain signals from all N fibers in set 130, which have been mixed together in directional coupler 140 and also throughout the length of fiber 220. Only one of those signals, however, will have a delay set by the nth one of delay loops in the set 132 that matches to the delay in the particular nth delay loop 162 of set 160. For that particular signal at that particular magnitude of delay, the two signals from the set of fibers 130 and set of fibers 160 will be coherent and will interfere to produce an electrical signal out of the nth detector at the same frequency as the phase modulation frequency. In order to avoid crosstalk between the channels, it is necessary that the coherence length of the signal from laser 10 is less than the delay length difference between the total length of adjacent channels, with a reasonable margin. For example, if the coherence length of a AlGaAs laser signal in singlemode glass fiber is approximately 5 cm, then the length difference should be about 20 cm. To achieve $-60$ dB rejection of adjacent channel, a length difference equal to seven times the coherence length should be used. The electrical signal from the nth detector will have a binary amplitude that will fall within one of two ranges corresponding to the presence or absence of a reflective strip on code plate 122 at the end of the nth fiber 130. All of the other detectors in the set of detectors 320 will also have an electrical signal at the phase modulation frequency that has a magnitude that falls into the ranges that indicate whether there was a reflective element lined up with that particular fiber or not.

Figure 2:
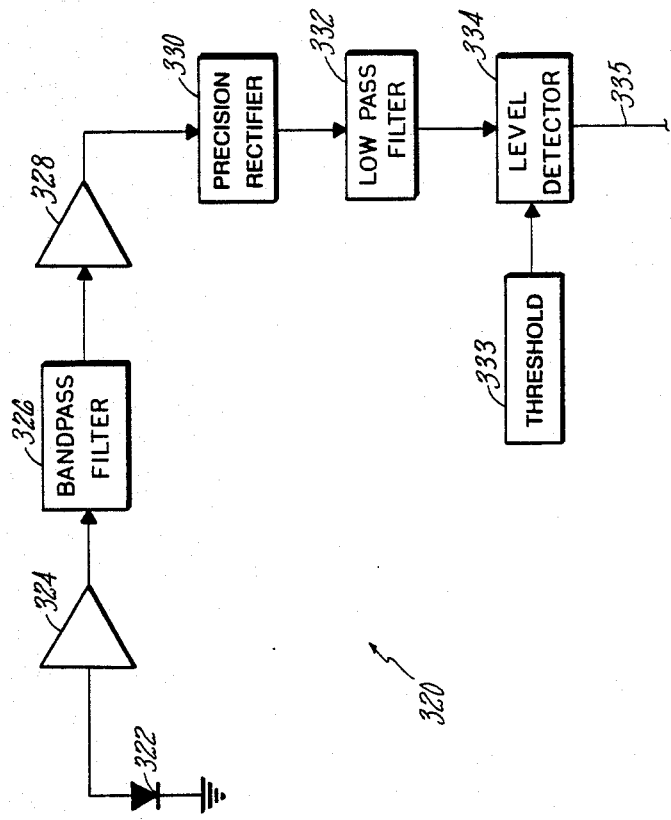
FIG. 2 illustrates schematically a detector circuit used in the invention.

Referring to FIG. 2, there is shown an embodiment of detector 320 and circuitry to perform envelope detection to recover the information in the encoder. Silicon PIN detector 322 is illuminated by light from the nth fiber of both sets 150 and 160. The output of detector 322 passes to a 50 kilo-ohm transimpedance amplifier 324, then through bandpass filter 326 having 3 dB points of 15 kHz and 150 kHz to pass the fundamental and second harmonic of the 70 kHz phase modulation carrier. The filtered undetected electrical signal then passes through a 10x gain stage 328 and is detected in a conventional precision rectifier 330. The raw detected electrical signal from rectifier 330 is integrated by a low-pass filter 332 having a 3 kHz bandwidth. The essentially DC signal from filter 332 is an input to comparator 334, which compares it with a reference signal from circuit 333 to produce a binary standard-level output on terminal 335. The signal in the photodetector is $$P(t) = P_r + P_i + P_s + 2\sqrt{P_r P_s} \cos(\phi_b + \phi_o \sin \omega t) \quad (1)$$

where $\phi_o \sin \omega t$ is the carrier signal imposed by the phase modulator 255 and $\phi_b$ is the bias phase due to the small mismatch between the arms of the interferometer. The ac part of this signal has components $$P_\omega(t) = 4\sqrt{P_r P_s} J_1(\phi_o) \sin \phi_b \sin \omega t \quad (2a)$$

and $$P_{2\omega}(t) = 4\sqrt{P_r P_s} J_2(\phi_o) \cos \phi_b \cos 2\omega t \quad (2b)$$

at the fundamental and second harmonic of the phase carrier frequency, respectively, where $J_1(\phi)$ and $J_2(\phi)$ are Bessel functions. Each of these signals is subject to fading as the bias phase drifts, but with the amplitude of the phase carrier set by comparison at of the first and second harmonic signals, say, to 2.6 rad (where $J_1(\phi) = J_2(\phi)$) these two signals can be combined as $$P = P_\omega(t) + P_{2\omega}(t) = 1.8 \sqrt{P_r P_s} \quad (3)$$

which is independent of the bias phase. This essentially DC signal can be achieved by envelope detecting, which is conventionally rectifying and low-pass filtering the ac signal from the photodiode, eq. (2), as described above.

The use of envelope detection provides a signal that has superior stability to that of alternative techniques. Setting the bandwidth of filter 326 to pass both the fundamental and second harmonic provides resistance to fading as the bias phase drifts, since these signals may be combined when the phase modulation signal is set emperically as described above.

This type of detection is an amplitude shift keyed coherent optical receiver. It has been shown that in this type of receiver 80 photons are needed in each bit of data to achieve a bit error rate (BER) of $10^{-9}$, so the minimum power required in the signal is $$P_{smin} = 80(hc/\lambda) \quad (4)$$

where h is Planck's constant, c the speed of light, $\lambda$ the wavelength of the laser, and f is the bit rate. Thus for a wavelength of 830 nm and a data rate of 10 kbps, the minimum power required from the sensor arm is $10^{-6}$W.

The flux margins of the circuit can now be estimated by expressing the reference power, $P_r$, and signal power, $P_s$, in terms of the laser power, $P_o$, and losses of the circuit. The reference beam encounters one an $N \times N$ coupler (where N is the number of channels on the code plate) and two a $2 \times 2$ couplers so $$P_r = P_o/(4N) \quad (5)$$

The sensor beam encounters three passes through $N \times N$ couplers, one reflection from the code plate, and three passes through a $2 \times 2$ coupler so $$P_s = P_o(\alpha(4N^3)) \quad (6)$$

where $\alpha$ is the loss at the code plate.

As a typical example take $P_o = 1$ mW, N = 12, and $\alpha = 0.1$ making the reference power 21 $\mu$W and the signal power 0.001 $\mu$W. Comparing this to the minimum power required to achieve a $10^{-9}$ bit error rate, the flux margin of the sensor arm is estimated to be 30 dB. The flux margin in the reference arm can be estimated by requiring that the photocurrent produced by the reference power be much greater than the dark current of the photodiode. Assuming a typical dark current of 20 nA, the flux margin in the reference is 27 dB for this example.

Note that due to the heterodyne gain, the power in the heterodyne signal is much greater than the power returned from the transducer. In the example above, there is a gain of 21 dB achieved with coherent detection. Also note that the impacts of the losses in the transducer and the contrast of the code plate on the signal power are reduced by a factor of two, i.e., 10 dB of loss reduces the signal by only 5 dB and 20 dB contrast produces only a 10 dB change in signal level.

The maximum number of channels allowed for a given laser power and bit error rate is calculated by combining eqs. (4) and (6) and solving $$N_{max} = {}^3 \sqrt{(\alpha P_o/f)(\lambda/320 \, hc)} \quad (7)$$

For the example given above, the maximum number of channels is 100.

An important advantage of this system is that only a single cable is required to pass both to and from the remote sensing area in question. This will obviously be a substantial advantage in cases where space is limited. Those skilled in the art will readily realize that a second cable 220' can be added for redundancy, if it is desired.

A further advantage of this system, is that laser 10 can be a cw laser, such as an optical diode laser, which is known to those skilled in the art to be very reliable.

It is not necessary that the phase modulation be applied to fiber 145 and it may be applied in any convenient location, such as fibers 150.

It should be understood that the invention is not limited to the particular embodiments shown and described herein, but that various changes and modifications may be made without departing from the spirit and scope of this novel concept as defined by the following claim.

I claim:

1. A system for remotely sensing a parameter comprising:
   a laser for generating an optical carrier signal of optical radiation at an optical carrier signal frequency and directing said optical radiation into a source optical fiber of a network of optical fibers, said optical radiation having a predetermined coherence length within said network of optical fibers;
   a reference set of at least two reference optical fibers in a detection unit;
   fiber optic transmission means, within said network of optical fibers, for carrying optical signals from said detection unit to a remote location and for carrying modulated optical signals from said remote location to said detection unit;
   means for modulating said optical carrier signal;
   a sensing unit having at least two sensing optical fibers corresponding to said at least two reference optical fibers;
   means for detecting modulated signals; characterized in that;
   a first optical coupler is attached to said source optical fiber for receiving said optical carrier signal and coupling optical radiation from said source fiber into a set of intermediate fibers and for coupling optical signals transmitted from said remote location into selected ones of said set of intermediate fibers;
   a transmission fiber, that is one of said set of intermediate fibers, extends from said first directional coupler to said remote location;
   a second optical coupler is located at said remote location for coupling radiation to and from said transmission fiber and said set of at least two sensor fibers which are connected in parallel to said second optical coupler; said set of at least two sensor fibers includes at least one nth sensor fiber, having a sensor fiber end and an nth sensor delay length, for receiving optical radiation at said carrier signal frequency, for transmitting said optical radiation to said sensor fiber end, and for transmitting an nth amplitude modulated sensor signal of optical radiation at said carrier signal frequency from said sensor fiber end to said second optical coupler;
   a modulation device is positioned at said sensor end, for amplitude modulating said optical radiation in accordance with a data parameter and for coupling amplitude modulated optical radiation back into said sensor end;
   said set of at least two reference fibers includes at least one reference optical fiber that is one of said set of intermediate fibers, having an nth reference delay length that corresponds to said nth sensor delay length, and being connected between said first optical coupler and an nth optical radiation detector, for receiving optical radiation coupled from said source optical fiber through said first optical coupler and for carrying said optical radiation as a reference optical signal;
   said detection unit includes at least one signal optical fiber, connected to said first directional coupler, for receiving said nth sensor signal of optical radiation coupled from said transmission fiber through said first optical coupler and for transmitting said nth sensor signal to said nth optical radiation detector;
   means for impressing a phase modulation signal at a phase modulation frequency on one of said reference optical signal in said at least one reference optical fiber or said nth sensor signal in said at least one signal optical fiber;
   in which system, said predetermined coherence length is less than a predetermined delay length difference that is the smallest difference between any two delay lengths of said set of sensor fibers, whereby only said nth sensor signal is coherent with said nth reference optical signal at said nth optical detector, and said nth optical radiation detector generates a signal at said phase modulation frequency representative of said nth sensor signal.

2. A system according to claim 1, further characterized in that said nth optical radiation detector comprises means for producing an electrical detector signal at said phase modulation frequency and having an amplitude dependent on said amplitude modulated sensor signal; and said electrical detector signal is rectified and integrated to produce an output signal representative of said data parameter.

3. A system according to claim 2, further characterized in that said nth radiation detector produces an electrical signal at said phase modulation frequency and another at its second harmonic; and that both said electrical signals are passed to a rectifier circuit, the output of which has an amplitude representative of said data parameter.

* * * * *